US008746091B2

(12) United States Patent
Breimon

(10) Patent No.: US 8,746,091 B2
(45) Date of Patent: Jun. 10, 2014

(54) SANITARY CLEAN IN PLACE MICROWAVE PROBE AND SEALING GASKET ASSEMBLY

(75) Inventor: Scott Richard Breimon, Delano, MN (US)

(73) Assignee: Thermo Fisher Scientific, Coon Rapids, MN (US)

( * ) Notice: Subject to any disclaimer, the term of this patent is extended or adjusted under 35 U.S.C. 154(b) by 381 days.

(21) Appl. No.: 13/136,163

(22) Filed: Jul. 23, 2011

(65) Prior Publication Data

US 2013/0019701 A1 Jan. 24, 2013

(51) Int. Cl.
*G01D 21/00* (2006.01)

(52) U.S. Cl.
USPC ........ 73/866.5

(58) Field of Classification Search
USPC ........ 73/866.5
See application file for complete search history.

(56) References Cited

U.S. PATENT DOCUMENTS 3,612,996 A * 10/1971 Bleackley ........ 324/634
3,818,333 A * 6/1974 Walker ........ 324/640
5,115,218 A * 5/1992 Jean ........ 333/252
5,331,284 A * 7/1994 Jean et al. ........ 324/639
5,455,516 A * 10/1995 Jean et al. ........ 324/639
5,495,218 A * 2/1996 Erb et al. ........ 333/248
5,703,289 A * 12/1997 Mulrooney ........ 73/290 V
2012/0319702 A1* 12/2012 Butler et al. ........ 324/639

* cited by examiner

*Primary Examiner* — Hezron E Williams
*Assistant Examiner* — Mark A Shabman
(74) *Attorney, Agent, or Firm* — David George Johnson

(57) ABSTRACT

A process seal (24) for separating the flowing material in a test chamber (5) from an antenna element (19) used to emit or receive a signal propagating through the test chamber. The process seal (24) includes a circumferential groove (47) which retains a sealing gasket (26) that permits the process seal to be mounted within an opening (11) in the chamber (5). The gasket (26) is formed with a t-shaped cross section (56) in which the narrow portion (62) of the cross section is formed with an inclined sidewall 63 which abuts a similarly inclined sidewall (65) on the process seal lip (46). An inner lobe of the cross section (56) fits within a groove (47) that is formed adjacent to the bottom surface (45) of the process seal (24). Captive clamping knobs (72, 73, 74, and 54) or captive bolts (14, 15, 16, and 55) fasten a probe assembly (1) including the antenna element (19) and the process seal (24) to the test chamber (5). An alternative process seal (77) permits the use of an O-ring (78).

5 Claims, 7 Drawing Sheets

SANITARY CLEAN IN PLACE MICROWAVE PROBE AND SEALING GASKET ASSEMBLY

FIELD OF THE INVENTION

This invention relates generally to the field of Guided Microwave Spectroscopy, and more particularly to housing assemblies that permit a flowing material to be subjected to microwave radiation.

DESCRIPTION OF RELATED TECHNOLOGY

The use of a microwave waveguide cutoff frequency to characterize properties of materials is commonly referred to as Guided Microwave Spectroscopy (GMS) and is described, for example, in U.S. Pat. No. 5,331,284 (METER AND METHOD FOR IN SITU MEASUREMENT OF THE ELECTROMAGNETIC PROPERTIES OF VARIOUS PROCESS MATERIALS USING CUTOFF FREQUENCY CHARACTERIZATION AND ANALYSIS). In typical GMS implementations a flowing fluid or slurry material is continuously introduced into a chamber that is subject to microwave radiation. A microwave signal that has passed through the flowing material has altered characteristics when compared to the originally transmitted radio frequency energy, and a comparison of the transmitted and received signals permits certain properties of the material to be determined.

The flowing material within the chamber must necessarily be contained, often under high pressure and temperature, while still permitting some path for the introduction and detection of the microwave GMS signal. Since the chamber is primarily metallic and hence represents a barrier to radio frequency energy, a substantially microwave transparent process window or seal must be provided within the wall of the chamber. The implementation of a suitable process seal in an industrial environment presents numerous challenges, particularly in a food processing context. Hygienic conditions must be maintained in the area where instrumentation enters the measurement chamber, which requires the elimination of discontinuities, or voids where the material under test may accumulate, thereby creating biological risks. Typically the fluid within the measurement chamber will be at a substantial pressure. The geometry in the region where a seal or interface is located often introduces localized zones of fluid stagnation within the chamber which cannot be effectively cleaned in situ by routine Clean-In-Place (CIP) procedures. This results in the need to dismantle the support structure in order to carry out manual cleaning procedures on the dismantled components at frequent intervals.

A conventional prior art approach to a process seal is disclosed in U.S. Pat. No. 5,115,218 (MICROWAVE PROCESS SEAL AND METHOD), which discloses the use of a grooved seal intended to prevent the accumulation of condensation and foreign material on the seal which would attenuate a microwave signal.

Another example of a process seal is disclosed in U.S. Pat. No. 5,495,218 (MICROWAVE WAVEGUIDE SEAL ASSEMBLY), which addresses the problem of using a relatively soft and thin polytetrafluoroethylene (PTFE) material in a high pressure, high temperature environment by constraining the seal within a precisely shaped and dimensioned cavity that prevents deformation of the seal.

A final example of a process seal is disclosed in U.S. Pat. No. 5,703,289 (MICROWAVE TRANSMITTER HOUSING), which addresses the problem of damaging the fluid impermeable process seal mounting arrangement when maintenance is required to be performed on instrumentation that is adjacent to the process seal. The '209 patent proposes the use of a first chamber for the process seal and a separate second chamber for the instrumentation that permits the instrumentation to be individually mounted, removed and maintained without affecting the integrity of the process seal.

SUMMARY OF THE INVENTION

The present invention is a probe mounting assembly using a low dielectric material process seal with a sealing gasket that contacts and contains material flowing through a chamber, pipe, container or other material retaining structure. The process seal contains a loop antenna which is suitable for either emitting or receiving a microwave signal. The process seal is affixed to a probe housing and contains an O-ring to isolate the loop antenna element from moisture. The sealing gasket or t-gasket permits the probe mounting assembly to be cleanable in place. In one preferred implementation of the present invention, thumb screws are included to permit manual removal of the assembly.

DETAILED DESCRIPTION OF THE INVENTION

Figure 1:
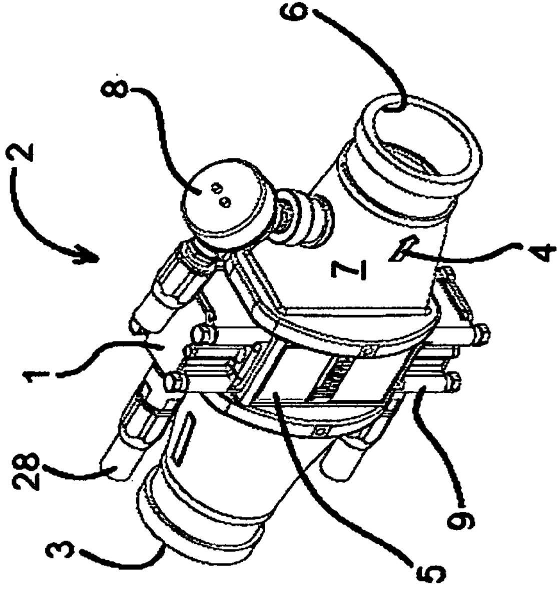
FIG. 1 is an isometric view of the present invention mounted on a guided wave spectroscopy measurement cell.
Figure 2:
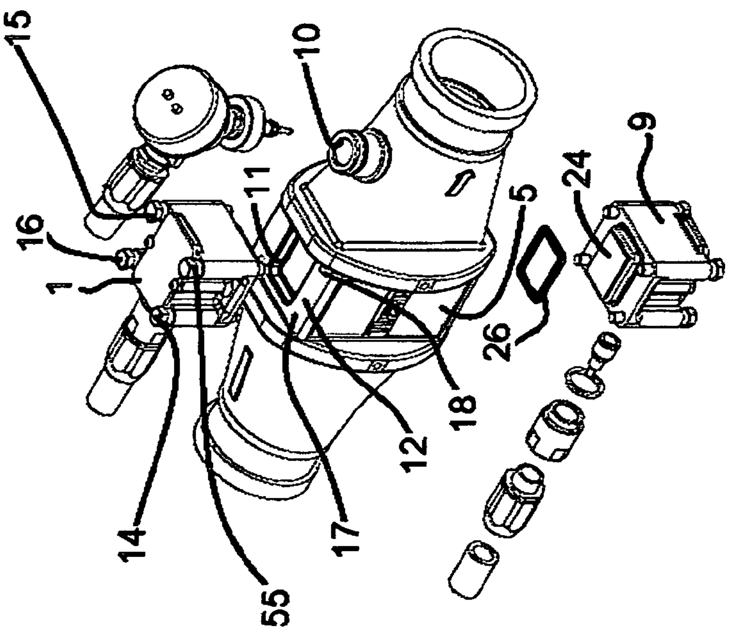
FIG. 2 is an isometric view of the present invention as shown in FIG. 1 with some of the components depicted in a spaced apart relationship.
Figure 4:
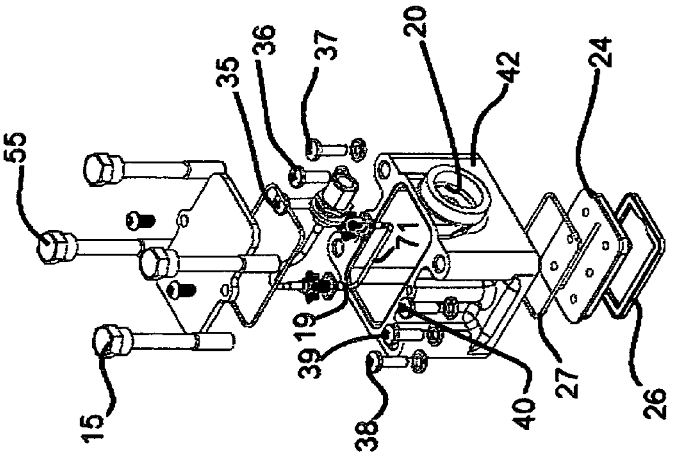
FIG. 4 is an exploded view of the invention as depicted FIG. 3.

FIG. 1 depicts two examples 1 and 9 of the probe assembly of the present invention affixed to a measurement cell assembly 2. The probe assemblies 1 and 9 are substantially identical. As also seen in FIG. 4, the probe assembly includes a pressure plate or housing 42 that is integrally formed, fabricated, or cast as rectangular box that is open at the top. Similarly, the measurement cell assembly 2 includes a test chamber 5 that forms a rectangular channel open at each end. A flowable material under test flows generally in the direction of arrow 4 through the test chamber 5. The material under test enters the measurement cell at inlet 3 and exits at cell outlet 6. Referring also to FIG. 2, a transitional section 7 resides between the chamber 5 and the outlet 6 and includes an orifice 10 formed to accept and retain a resistance temperature detector (RTD) assembly 8 which measures a temperature value within the material under test based on the current or voltage variation through an electrical conductor such as a platinum coil.

Figure 3:
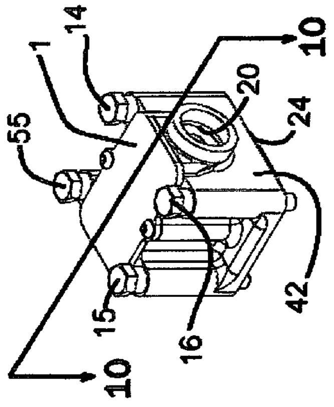
FIG. 3 is an isometric view of the present invention.
Figure 5:
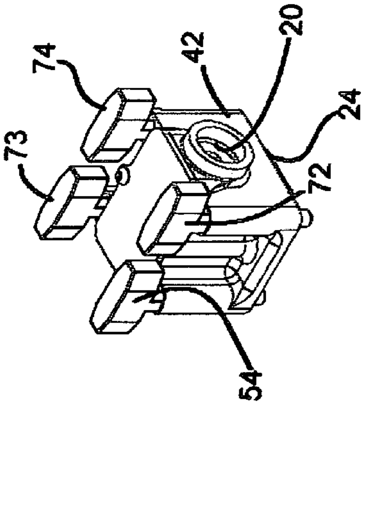
FIG. 5 is an isometric view of a second embodiment of the invention.
Figure 10:
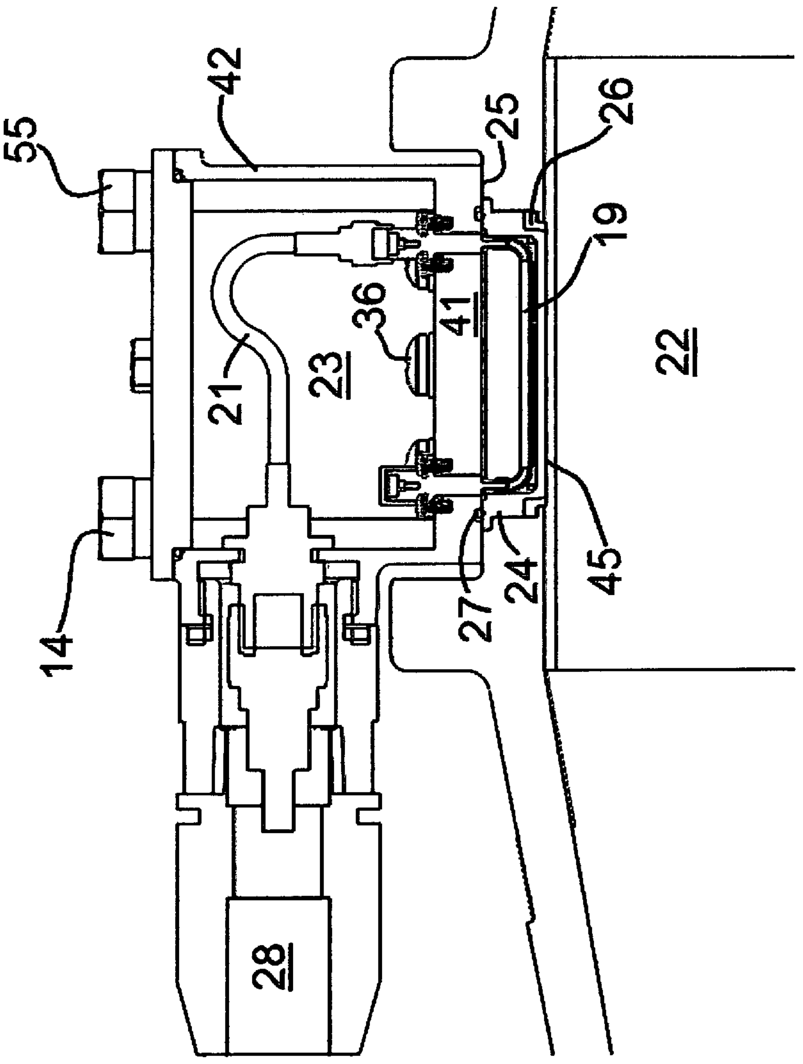
FIG. 10 is a sectional view taken along line 10-10 in FIG. 3, with some additional portions of the measurement cell that are depicted in FIG. 1 shown for clarity.

The chamber 5 includes a generally rectangular opening or access orifice 11 which permits access to material flowing through the chamber. Referring also to FIG. 3, the probe assembly 1 is mounted onto the generally planar surface 12 of the chamber 5 by means of four captive bolts 55, 14, 15 and 16 which are retained by mating orifices, such as orifices 17 and 18, formed within the planar surface 12. Depicted in FIG. 5 is an alternate embodiment of the invention in which the captive bolts are replaced with clamping knobs 54, 72, 73 and 74 so as to permit the installation and removal of the probe assembly without the use of tools. As seen in FIGS. 4 and 10, the probe assembly 1 includes an antenna element 19 which is suspended within the housing 42. The antenna element is interconnected to a source of microwave energy via a coaxial cable 21. The cable 21 enters the housing 42 via a conduit assembly 28 which passes through an orifice or electronics access port 20. The antenna 19 emits a microwave signal into the interior region 22 of the chamber 5, thereby causing any material flowing through the chamber 5 to be irradiated by the emitted microwave radiation. The substantially identical probe assembly 9 is mounted in an opposed relationship to the probe assembly 1. The antenna within the probe assembly 9 receives the emitted signal originating from the probe assembly 1. Ideally the material under test flowing through the chamber 5 alters the emitted signal in a manner that permits at least some characteristics of the flowing material under test to be discerned from subsequent analysis of the signal received by probe assembly 9.

Figure 6:
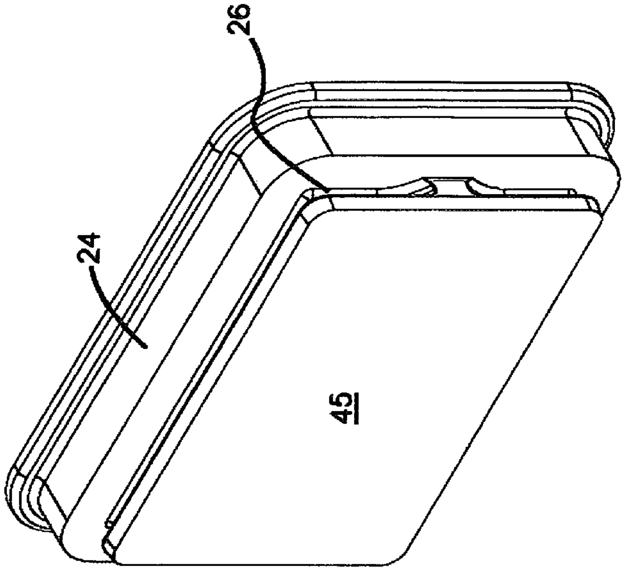
FIG. 6 is an isometric view of the process seal and gasket assembly depicted in FIG. 4.
Figure 7:
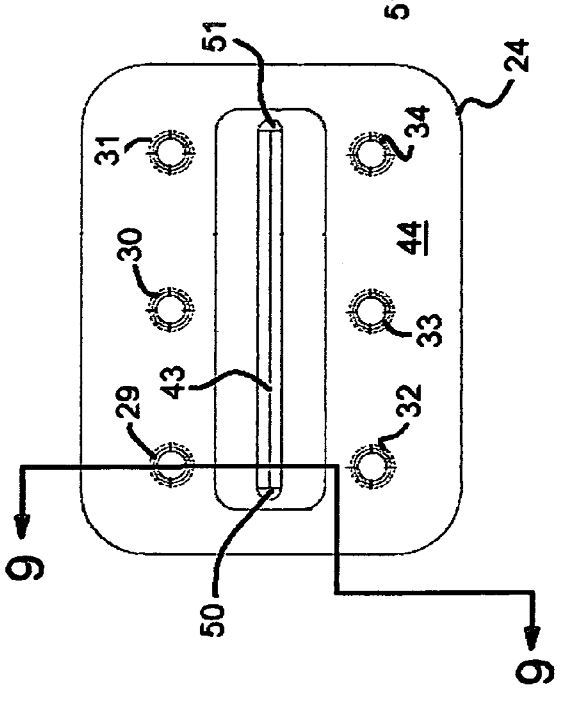
FIG. 7 is a plan view of the process seal depicted in FIG. 4.

In order to prevent material within the interior region 22 of the chamber 5 from moving outside of the interior region 22, a process seal 24 is provided at the interface between the interior 22 the antenna 19 of the probe assembly 1. An O-ring 27 is used to provide a fluid tight seal between the bottom surface 25 of the probe assembly 1 and the planar surface 12 of the chamber 5. As seen in FIGS. 4, 6 and 10, the process seal 24 is surrounded by a t-gasket 26 in order to prevent fluid penetration by the material under test through the orifice 11. Referring to FIG. 7, the process seal 24 is a formed as a generally rectangular block or plate composed of a rigid, low dielectric material such as a plastic or ceramic which can withstand the temperatures and pressures to which it is expected to be exposed in a particular operating environment. In a preferred embodiment of the present invention, the process seal is composed substantially of polyetheretherketone.

Figure 9:
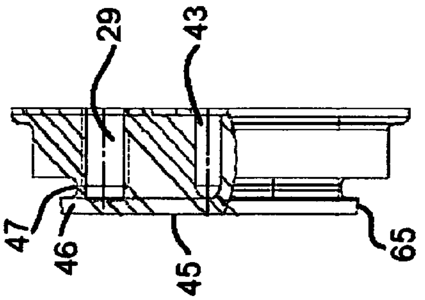
FIG. 9 is a sectional view taken along line 9-9 in FIG. 8.

The process seal 24 includes six symmetrically spaced mounting holes 29, 30, 31, 32, 33 and 34 having a depth of approximately eleven millimeters and threaded to accept an M6 threaded screw. The screws 35, 36, 37, 38, 39 and 40, each having a length of approximately twenty millimeters are used to secure the process seal 24 to the bottom 41 of the housing 42 which forms the body of the probe assembly 1. Referring also to FIG. 9, a centrally located antenna access groove 43 is formed into the planar inner or top surface 44 of the process seal 24, the groove 43 being suitably dimensioned to accept and partially surround the antenna 19. The antenna access groove 43 extends from the inner surface 44 toward the outer surface 45 of the process seal 24, thereby causing the groove 43 to be substantially orthogonal to both the planar inner surface 44 and the planar outer surface 45. The antenna access groove 43 is suitably dimensioned to substantially surround most of the long, linear portion 71 of the antenna element 19. The antenna element 19 is substantially parallel to the planar outer surface 45 and the direction of flow 4 of the material flowing within the test chamber 5.

In this manner, the antenna 19 is brought into close proximity with the material under test while only a relatively minute amount of any other intervening substance or mass is present to affect the emitted microwave signal. In a preferred embodiment, the antenna element 19 resides within four millimeters of the flowing material within the test chamber 5. As seen in FIG. 10, planar outer or bottom surface 45 of the process seal is substantially coplanar with the interior wall 52 which defines the interior region 22 of the test chamber 5. The planar outer surface 45 substantially fills the rectangular opening or access orifice 11 and thereby creates a substantially continuous surface contour within the test chamber 5.

Figure 8:
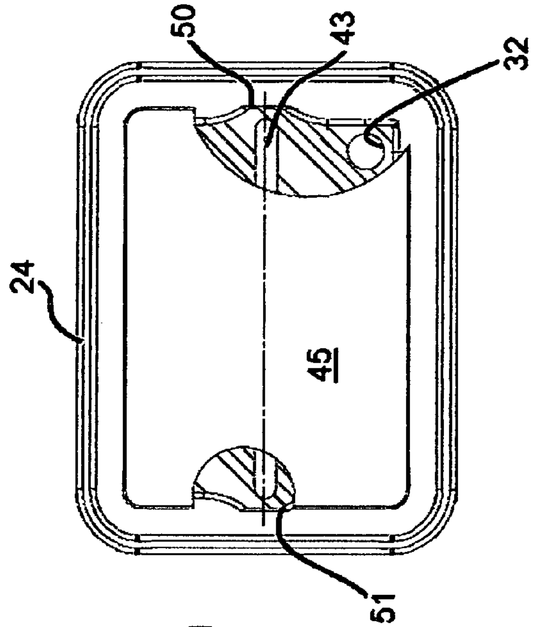
FIG. 8 is a bottom plan view of the process seal depicted in FIG. 7, with some portions of the bottom surface removed for clarity.
Figure 13:
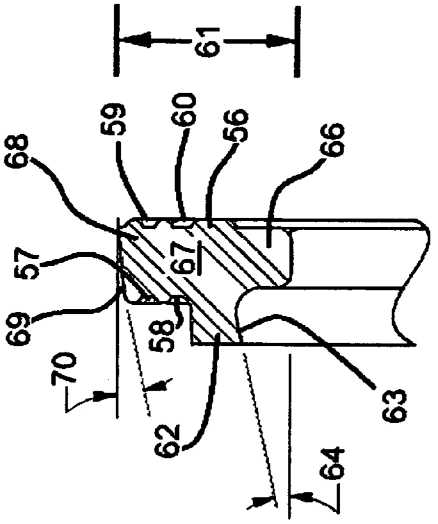
FIG. 13 is a detail view of region 13 as shown in FIG. 12.
Figure 12:
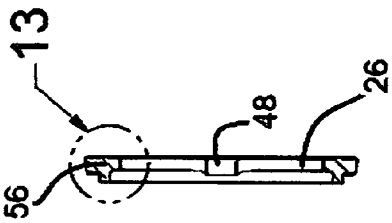
FIG. 12 is a sectional view taken along line 12-12 as shown in FIG. 11.
Figure 11:
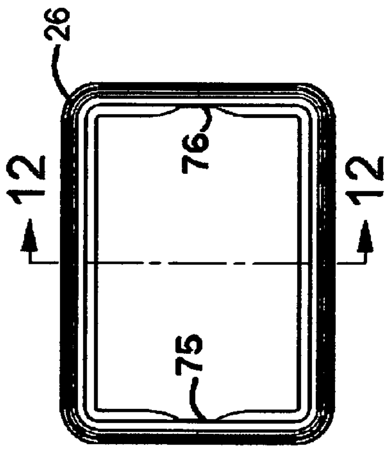
FIG. 11 is a plan view of the t-gasket depicted in FIG. 4.

Adjacent to the lower surface 45 of the process seal 24 a lip 46 is formed as defined by a circumferential mounting groove 47. The t-gasket 26 fits within the circumferential mounting groove 47. As seen in FIG. 8, there are two elongated portions 48 and 49 of the mounting groove 47 which is shaped and dimensioned to clear the end regions 50 and 51 of groove 43. Referring also to FIGS. 11, 12 and 13, the t-gasket 26 includes elongated portions 75 and 76 which are shaped and dimensioned to accommodate the two elongated portions 48 and 49 of the mounting groove 47. The t-gasket 26 is formed so as to have a t-shaped cross section 56 in which a series of parallel grooves 57, 58, 59 and 60 are formed. The width 61 of the wide t-section 67 is approximately 5.87 millimeters. The narrow t-section 62 is formed to have an inclined sidewall 63 which has a twelve degree angle of inclination 64 that is compatible with the angle of inclination of the side wall 65 of the lip 46 of the process seal 24. The wide t-section 67 is formed to include an inner lobe 66 that is dimensioned to fit within the groove 47 of the process seal. The outer lobe 68 is formed with an outer sidewall 69 that is inclined at an angle 70 of approximately three degrees in order to permit an interference fit with the opening 11 of the test chamber 5. In this manner the process seal 24 may be inserted into the test chamber 5 and form a fluid tight seal at the interface between the two components. In a preferred embodiment, the t-gasket 26 is composed of a fluoroelastomer sheet rubber that is approved for food and pharmaceutical sealing applications.

Figure 14:
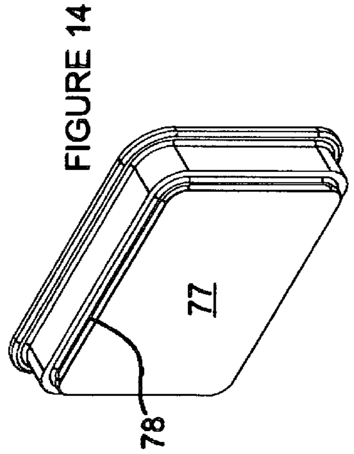
FIG. 14 is an isometric view of a process seal utilizing an O-ring gasket assembly constructed in accordance with the principles of the present invention.
Figure 15:
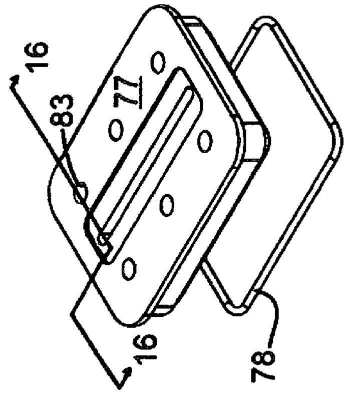
FIG. 15 is an exploded view of the process seal and O-ring gasket assembly depicted in FIG. 14.
Figure 16:
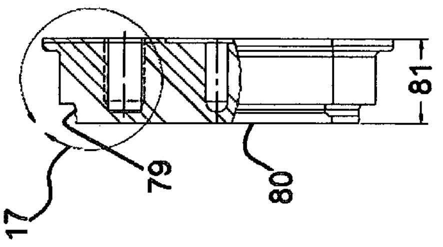
FIG. 16 is a sectional view taken along line 16-16 as shown in FIG. 15.
Figure 17:
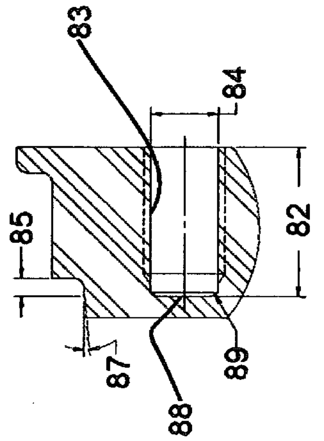
FIG. 17 is a detail view of region 17 as shown in FIG. 16.

While the invention has been described with reference to the preferred embodiments, various modifications to the foregoing concept of an easily installable and removable clean in place probe assembly may be readily envisioned. For example, the specific geometry of the t-gasket may be modified in shape and cross section as may be required for a particular opening in a test chamber or conduit. In some applications an O-ring may provide a sufficient seal where relatively low pressures are encountered. An example of a process seal 77 utilizing an O-ring 78 is depicted in FIGS. 14 and 15. Referring also to FIGS. 16 and 17, the process seal 77 includes a circumferential recess 79 is formed adjacent to the bottom surface 80. The distance 85 occupied by the O-ring 78 is approximately 1.37 millimeters. The overall height 81 of the process seal 77 is approximately 12.78 millimeter. The depth 82 of each threaded mounting orifice 83 is approximately 11.2 millimeters while the width 84 of each orifice 83 is approximately five millimeters. The mounting orifice 83 transitions to orifice bottom surface 88 through a bevel 89 of approximately sixty degrees. The inner wall 86 of the process seal 77 is inclined by an angle 87 of approximately eight degrees. Other modifications may be practiced by those skilled in this field without departing from the scope of the claims.

I claim:

1. A probe assembly adapted to be mounted adjacent to a flowing material under test residing within a test chamber that includes an access orifice, comprising:

(a) a housing, the housing further comprising:
  (i) an integrally formed substantially rectangular channel, the channel being open at an upper region; and
  (ii) a substantially planar bottom, the bottom being substantially parallel to the upper region;
(b) an antenna element, the antenna element being suspended within the housing; and
(c) a process seal, the process seal comprising:
  (i) a substantially planar outer surface;
  (ii) a substantially planar inner surface;
  (iii) an antenna access groove, the antenna access groove being formed so as to be substantially orthogonal to the substantially planar inner surface and the substantially planar outer surface, the antenna access groove being suitably dimensioned to substantially surround most of a longest linear portion of the antenna element, the longest linear portion of the antenna element being substantially parallel to the substantially planar outer surface of the process seal, the antenna access groove having a depth sufficient to permit the longest linear portion of the antenna element to be within four millimeters of the flowing material under test within the test chamber, wherein the process seal is affixed to the substantially planar bottom of the housing, the substantially planar outer surface being adapted to substantially fill the access orifice so as to create a substantially continuous surface contour within the test chamber, the process seal isolating the antenna element from the flowing material under test;
  (iv) a circumferential gasket retaining groove;
  (v) a lip, the lip being defined by the circumferential gasket retaining groove such that the lip resides between the circumferential gasket retaining groove and the outer surface of the process seal; and
  (vi) a gasket, the gasket being supported by the lip, the gasket being in a substantially continuous abutting relationship with the circumferential gasket retaining groove, the gasket comprising a substantially t-shaped cross section, the substantially t-shaped cross section further comprising:
(a) an inner lobe, the inner lobe residing within the circumferential gasket retaining groove;
(b) an outer lobe, the outer lobe forming an abutting seal with the access orifice; and
(c) a relatively narrower portion, the relatively narrower portion further comprising:
  (i) an orthogonal sidewall, the orthogonal sidewall being substantially orthogonal to the substantially planar outer surface; the orthogonal sidewall being adapted to abut a portion of the test chamber adjacent to the access orifice; and
  (ii) an inclined sidewall, the inclined sidewall being adapted to abut the lip.

2. The probe assembly of claim 1, wherein the gasket retaining groove is formed to include two substantially opposed elongated end regions, one of each of the two substantially elongated end regions being adjacent to an end portion of the antenna access groove so as to provide relatively greater clearance between the antenna element and the gasket retaining groove at a region of closest approach between the gasket retaining groove and the antenna access groove.

3. The probe assembly of claim 2, wherein the lip is formed to include an inclined outer surface, the inclined outer surface being suitably dimensioned so as to abut the inclined sidewall of the relatively narrower portion of the substantially t-shaped cross section of the gasket.

4. The probe assembly of claim 3, wherein the housing further comprises:

(a) a plurality of longitudinal bores, the longitudinal bores being formed as to pass through the housing from a region adjacent to the first end of the substantially rectangular channel to the second end of the substantially rectangular channel; and
(b) at least one access port, the access port being formed so as to pass through a sidewall of the housing so as to create a path between the antenna element and an region external to the housing.

5. The probe assembly of claim 4 further comprising:

(a) a plurality of captive bolts, one of each of the captive bolts extending through one of each of the longitudinal bores, the captive bolts being retained by threaded orifices residing within a mounting surface of the test chamber; and
(b) a plurality of clamping knobs, one of each of the captive knobs extending through one of each of the longitudinal bores, the captive knobs being retained by threaded orifices residing within a mounting surface of the test chamber so as to permit the probe assembly to be attached and removed from the mounting surface of the test chamber without the use of tools.

* * * * *